(12) United States Patent
Shifman (10) Patent No.: US 11,068,920 B2
(45) Date of Patent: Jul. 20, 2021

(54) METHODS, PLATFORMS AND SYSTEMS FOR PAYING PERSONS FOR USE OF THEIR PERSONAL INTELLIGENCE PROFILE DATA

(71) Applicant: Orit Shifman, Forch (CH)

(72) Inventor: Orit Shifman, Forch (CH)

( * ) Notice: Subject to any disclaimer, the term of this patent is extended or adjusted under 35 U.S.C. 154(b) by 543 days.

(21) Appl. No.: 15/302,305

(22) PCT Filed: Apr. 7, 2015

(86) PCT No.: PCT/IB2015/052518
§ 371 (c)(1),
(2) Date: Oct. 6, 2016

(87) PCT Pub. No.: WO2015/155689
PCT Pub. Date: Oct. 15, 2015

(65) Prior Publication Data
US 2017/0032401 A1 Feb. 2, 2017

Related U.S. Application Data

(60) Provisional application No. 61/977,230, filed on Apr. 9, 2014.

(51) Int. Cl.
*G06Q 30/00* (2012.01)
*G06Q 30/02* (2012.01)
(Continued)

(52) U.S. Cl.
CPC ......... *G06Q 30/0207* (2013.01); *G06Q 30/02* (2013.01); *G06Q 30/0273* (2013.01);
(Continued)

(58) Field of Classification Search
CPC ............... G06Q 30/0207; G06Q 30/02; G06Q 30/0273; H04L 67/18; H04W 4/027; H04W 4/70
See application file for complete search history.

(56) References Cited

U.S. PATENT DOCUMENTS

2006/0015904 A1* 1/2006 Marcus ................ G11B 27/034
725/46
2009/0172419 A1* 7/2009 Takayama ............... G06F 21/57
713/193

(Continued)

OTHER PUBLICATIONS

Evaluation Framework for Personal Health Records: Microsoft Healthvault Vs. Google Health (Year: 2010).*

(Continued)

*Primary Examiner* — Maria V Vanderhorst
(74) *Attorney, Agent, or Firm* — Pearl Cohen Zedek Latzer Baratz LLP (57) ABSTRACT

Methods and systems for rewarding a personal intelligence profile (PIP) owner who owns associated PIP data used by a PIP data user. The methods are performed using a PIP platform that includes a dedicated server that mediates between the PIP data owner and the PIP data user. A method may comprise, through the dedicated PIP platform, obtaining PIP data associated with the PIP data owner according to criteria defined by the PIP data owner, determining a value of the obtained PIP data, providing the PIP data to the PIP data user, and paying the PIP data owner a reward based on the obtained PIP data value.

8 Claims, 3 Drawing Sheets

(51) Int. Cl.
*H04L 29/08* (2006.01)
*G05B 19/418* (2006.01)
*H04W 4/02* (2018.01)
*H04W 4/70* (2018.01)

(52) U.S. Cl.
CPC .............. *H04L 67/18* (2013.01); *H04W 4/027* (2013.01); *H04W 4/70* (2018.02)

(56) References Cited

U.S. PATENT DOCUMENTS

| | | | |
|---|---|---|---|
| 2012/0010183 A1 | 4/2012 | Akhter et al. | |
| 2012/0101883 A1 | 4/2012 | Akhter et al. | |
| 2013/0111159 A1 | 5/2013 | Rice et al. | |
| 2013/0111519 A1* | 5/2013 | Rice | G06Q 30/02 725/34 |

OTHER PUBLICATIONS

Profile-based digital identity management—a better way to combat fraud. IEEE. (Year: 2010).*
International Search Report and Written Opinion issued in related PCT patent application PCT/IB2015/052518, dated Aug. 11, 2015. 9 pages.

* cited by examiner

METHODS, PLATFORMS AND SYSTEMS FOR PAYING PERSONS FOR USE OF THEIR PERSONAL INTELLIGENCE PROFILE DATA

FIELD

Embodiments disclosed herein relate in general to apparatus and methods for commoditizing information.

BACKGROUND

Personal intelligence profile ("PIP") data is being gathered constantly by different entities using various means. PIP data gathered on each person (that person referred to hereinafter as the "PIP data owner") may include personal information such as name, address, education, telephone numbers, IP address, gender, age, location, medical history, various types of preferences (in food, shopping, merchandise, art, music, travel, relaxation, etc.), consuming patterns, use of utilities, use of social services, legal records, photographs, voice recordings, blogs, status, views, etc.

One of the most active PIP data gathering means is via the Internet. PIP data is routinely gathered by search engines, and/or by electronic social media networks and/or by various smart-phone applications ("apps"), to list just a few of a very long list of such "PIP data gatherers". The practice of gathering and/or requesting personal information from a person who wishes to download apps or media content (visual or audio media) or who wants to access media content is widespread. Other active PIP data gatherers include credit card companies, credit rating agencies, legal bodies, various merchants, marketers and vendors, and other entities. The fast-growing use of mobile communication devices such as smart-phones and tablet computers ("tablets") has led to an "explosion" of apps. Many such apps are valued according to the number of their users and their PIP data. PIP data may also be gathered from data generated by smart detectors or embedded devices.

PIP data may be considered to be a valuable commodity. The PIP data of users that download and use an app is very valuable to the app developer, sometimes being the main asset that determines the developer's/app's value to a potential buyer. PIP data is also gathered when a person enters a monitored space such as a shop, looks at advertisements in indoor or outdoor environments, participates in various activities, etc.

PIP data owners are not always aware that their PIP data has been acquired, used, shared with, or otherwise provided to various entities. Under current and known practices, a PIP data owner may often see no profit at all, or may see only a small, indirect profit from his/her PIP data. Even if PIP data owners are aware that their PIP data is valuable, they often do not have an alternative to prevent their PIP data from being exploited.

For example, when an app company is purchased by another entity, users of a "free" app who were required to provide personal and other information in order to download the app may find their PIP data transferred to another entity. In fact, the "free" app is not free at all, since the PIP data may be more valuable than a fee the person downloading the app could pay anonymously to purchase the app. In some cases, the transfer or "trading" of the PIP data may represent an involuntary act, when the PIP data owners are not consulted on whether they agree to have their PIP data transferred. In other cases, PIP data owners may be asked to agree voluntarily to have their PIP data transferred to third parties, as a condition for receiving a service (for example, for downloading the "free" app). In such cases of involuntary or conditioned voluntary PIP data use, the PIP data owners may develop antagonistic feelings toward the entities involved in using their PIP data.

The description above is presented as a general overview of related art in this field and should not be construed as an admission that any of the information it contains constitutes prior art against the present patent application.

SUMMARY

Embodiments disclosed herein relate to methods, platforms and/or systems for providing a monetary benefit to a PIP data owner when his/her PIP data is made available by him/her to an extent and/or in a manner which is largely or solely controlled by the PIP data owner, to one or more PIP data users directly or through a mediating PIP platform. The PIP data owners, its users and/or the mediating PIP platform may use the PIP data to enhance and/or profit from a commercial and/or benefiting activity. Otherwise stated, the PIP data owner may provide and/or make available PIP data according to at least one criterion which is defined (e.g., by selection) by the PIP data owner. As outlined herein below in more detail, and merely to simplify the discussion that follows, such criterion or criteria may be expressed as a Level of Involvement or "I-level". Correspondingly, the PIP data user may receive, gather, obtain and/or fetch data from the PIP data owner directly or through the PIP platform based on the PIP data owner's I-level.

Moreover, the PIP data owner may be exposed to a perceptible item according to at least one criteria defined by him/her. Merely to simplify the discussion that follows, the latter criteria or criterion may herein be expressed as a Level of Openness or "O-level", as outlined herein further below in more detail. For instance, the PIP data owner may define at least one criterion based on which a commercial entity may expose the PIP data owner to a perceptible item. The criterion or criteria defined by the PIP data owner may also referred to as "owner-defined criteria". As outlined herein in more detail, the criterion or criteria may define rules for providing PIP data from the PIP platform to the PIP data user.

According to some embodiments, at least one criterion according to which PIP data is gathered may be defined from the side of the PIP data user. Such user-defined criteria may include, for example, the type of information described by the PIP data, the amount of PIP data to be gathered, and/or the like. According to some embodiments, user-defined criteria may define how the gathering of PIP data is prioritized and/or monetized. For instance, the gathering of PIP data with increased I-level and/or O-level may be prioritized over the gathering of PIP data with comparably lower I-level and/or O-level.

The above-mentioned commercial and/or benefiting activity may include (but is by no means limited to) advertising or marketing, surveys or statistics. More specifically, embodiments disclosed herein relate to commoditizing PIP data gathered actively and/or passively on a PIP data owner.

For simplicity, a method, platform or system disclosed herein is referred to as "PIP system", "PIP platform" and "PIP method".

The PIP data may exemplarily be descriptive of the PIP data owner's background and/or preferences. The PIP data may further and exemplarily be descriptive of feedback provided actively, and/or passively by a sensor and/or sensor system such as, e.g., by a GPS, Modem and/or a Subscriber-Identification Module (SIM); and/or by the PIP data owner, responsive to the PIP data owner exemplarily by being exposed to a perceptible item that is suitable to be sensible by a suitable sensor and/or by the human sensory apparatus such as, for example, a physical object, a movie, a clip, a video, an image, an audio output, a taste, smell and/or tactile stimuli associated with, e.g., an advertisement. Otherwise stated, such "perceptible item" may refer to and/or include and/or be associated with any stimuli that can be detected by the human body/sensory system, i.e., ophtalmoception and/or audioception and/or gustaoception and/or ofacoception and/or tactioception. Additional or alternative non-limiting examples of human sensing modalities may relate to thermoception, proprioception, nociception, and/or the like.

It should be noted that phrases such as "presenting a PIP data owner with a perceptible item", "providing a PIP data owner a perceptible item", "exposing a PIP data owner to a perceptible item" and/or the like, as well as grammatical variations thereof, may be used interchangeably and should by no means to be construed as limiting.

It should further be noted that phrases such as "presenting", "providing", "exposing the PIP data owner to a perceptible item", and/or the like may refer to any activity resulting in subjecting the PIP data owner to perceptible physical stimuli associated with the item. The PIP data owner may be subjected to physical stimuli without explicit and/or immediate prior request by the PIP data owner or, alternatively, responsive to a request issued by the PIP data owner to be exposed to a perceptible item. While the former may referred to as being "passive exposure", the latter may be referred to as "active exposure". However, to simplify the discussion that follows, exposing the PIP data owner to a perceptible may comprise both active as well as passive exposure.

Embodiments of a PIP system, PIP platform and PIP method disclosed herein may enable the person to define criteria on how his/her PIP data may be gathered and/or used by another entity. The other entity or entities may herein be referred to as "PIP data user". Based on the provided definition(s), the PIP data owner may be rewarded with money and/or monetary equivalent. Hence, the PIP data owner may consciously commoditize his/her PIP data and thus become an active trader of his/her PIP data in exchange for money and/or monetary equivalent. Embodiments of the PIP methods, platforms and systems disclosed herein may thus enable a PIP data owner to define rules resulting in an automatic filter employed by the PIP platform to control the use and/or gathering of PIP data by another party or entity.

These automatic filters may define, for example, which PIP data and/or to what extent PIP data may be gathered from devices and system (e.g., vehicles, home appliances) that are owned and/or associated with the PIP data owner, and/or define to what extent PIP data descriptive of, for example, electricity consumption, water consumption, environmental or housing temperature can be gathered. Such PIP data may also relate to data and/or be descriptive of monitoring and or data transfer devices such as e.g. information obtained from a GPS, a modem, a Subscriber-Identification Module (SIM) of a mobile communication device, and/or any other type of sensors and/or meters (including temperature, humidity and/or pressure sensors and/or the like; electricity and/or water consumption meters and/or the like) of, e.g., home appliances, vehicles, and/or devices and/or systems that are associated and/or owned by the PIP data owner. It is noted that a GPS for example may be considered to be a sensor and/or a data transmitting and/or receiving device.

Such filters may be defined by the PIP data owner and/or by the PIP data user and/or by the data mediating PIP platform.

For example, according to some embodiments, "vehicle or driving-related" PIP data descriptive of vehicle performance and/or driving behavior of the PIP data owner may be gathered by the PIP platform, e.g., according to criteria defined by the PIP data owner. It is noted that such vehicle-related PIP data may be processed on-site, at the vehicle itself, without requiring the PIP platform to perform further processing of gathered vehicle-related data. More specifically, the PIP platform may in some embodiments assign monetary and/or monetary-equivalent rewards to the vehicle-related PIP-data received at the platform, without the platform being required to make further analysis of the obtained vehicle-related PIP-data for enabling the platform to properly assign the monetary values.

Accordingly, the PIP platform may in general be configured to ensure that the PIP owner's data may be gathered and/or used (optionally only) by the PIP data user under a predefined agreement with the PIP data owner and (optionally) under the precondition that the PIP data owner receives money and/or monetary equivalent in exchange for providing his/her PIP data. Otherwise, PIP data may not be made available to another entity which may thus not become a PIP data user.

In some embodiments, a PIP platform may enable the PIP data owner to monitor the use and/or gathering of his/her PIP data. Based on the defined filter and/or the provided PIP data, the PIP data owner may be rewarded with money or monetary equivalent. Embodiments of the PIP methods, platforms and systems disclosed herein thus enable commoditizing a PIP data owner's PIP data and allow the PIP data owner to consciously and actively trade with his/her PIP data. A PIP data owner who consciously commoditizes and trades with his/her PIP data may herein be referred to also as a "participant".

In some embodiments, a PIP platform disclosed herein may be configured, e.g., by the PIP data owner, to selectively provide PIP data to one or more PIP data users. For example, the PIP data owner may define that his/her PIP data may be provided to one or more selected PIP data users of a group of PIP data users, e.g., according to the criteria defined by the PIP data owner.

In some embodiments, PIP data may be gathered from the PIP data owner for use by another entity without passing through the PIP platform. In such embodiments, the PIP platform may simply perform a monitoring function to ensure that the PIP data is gathered according to PIP data owner-defined criteria.

In some embodiments, in order for PIP data owners and/or PIP data users to become part of such system and/or method, their registration and/or enrolment may be required, which may optionally include requesting the owners' written consent or agreement that gathering and/or use of their PIP data may be made, including, e.g., forwarding PIP data received at the PIP platform to third parties.

The term "gathering of PIP data" as used herein, as well as grammatical variations thereof, may for example encompass additionally or alternatively the meaning of the term(s) "monitoring" and/or "accessing" and/or "scouring" and/or "copying" and/or "fetching" and/or "screening" of PIP data.

The term "use of PIP data" as used herein, as well as grammatical variations thereof, may for example encompass additionally or alternatively the meaning of the term(s) "processing" and/or "manipulating" and/or "exploiting" and/or "analyzing" of PIP data.

Hereinafter, any entity (other than the PIP data owner) that uses the PIP data for any purpose, in particular for the purpose of benefit (profit) from a commercial activity is a PIP data user. The benefit to the PIP data owner may be in money and/or in a monetary equivalent. In some embodiments, the transfer of PIP data to a PIP data user and the transfer of monetary or equivalent benefit to the PIP data owner are performed through a dedicated PIP platform and dedicated PIP system.

As already briefly mentioned above, the magnitude of the benefit or reward paid to the PIP data owner may be determined by, e.g., the PIP platform and/or the PIP data user, based on the value of the gathered PIP data. The value of the gathered PIP data may exemplarily be determined based on various parameters defined, e.g., by the PIP data owner such as, for example, the levels of exposure the owner of the PIP data is willing to allow.

In some embodiments, options concerning the various parameters selectable (determined) by the PIP data owner may additionally or alternatively be defined by the potential PIP data user. For example, a first parameter determined by the PIP data owner may relate to the level of openness or "O-level" descriptive of the extent a PIP data user may engage with the PIP data owner for obtaining PIP data that may exemplarily be descriptive of a feedback. The O-level may exemplarily be derived from criteria defined by the PIP data owner. Such criteria define constraints on the extent the PIP data owner can be exposed to an advertisement campaign or any other perceptible item.

According to some embodiments, another parameter determined by the PIP data owner may relate to the level of involvement or "I-level" of the PIP data owner in response to being exposed to a perceptible item. An I-Level may relate for instance to the quantity and/or quality of PIP data provided by the PIP data owner. In some embodiments, the I-level may be based on criteria defined by the PIP data owner, criteria that impose constraints on the use of PIP data by a potential PIP data user.

As outlined below in greater detail, such criteria may for example define constraints on the gathering and/or use of PIP data by a party other than the PIP data owner. For instance, the criteria may define constraints on the gathering of PIP data descriptive of email messages, and/or of personal profiles (including, e.g., personal pictures) published on computerized social networks, the extent according to which the movement of computerized devices associated with the PIP data owners, the amount and/or type of data that may be gathered from devices associated with the PIP data owners, and the like. For instance, the type and/or amount of data that may be gathered from physical objects associated with the PIP data owner may be defined by him/her. Such physical objects may for example include, navigation devices, medical devices (e.g., implants, needles), home appliances, vehicles (e.g., cars, bicycles, motorcycles), home entertainment systems, and the like.

As already briefly indicated above, the magnitude of the monetary benefit with which the PIP data owner may be disbursed by the PIP data user may be determined based on the O-Level and/or on the I-level, which may be used to define the value assigned to the PIP data.

In some embodiments involving communications or media networks or platforms, the PIP data owners are "users" of the content provided by or through such networks or platforms, while the owners or operators of the communications networks or platforms are PIP data users. In such embodiments, the PIP methods, platforms and systems disclosed herein enable the users to profit from PIP data obtained actively or passively by the network or platform owners. As used herein, "network" may refer to any network in which electronic communications or PIP data transfer occurs between a PIP data owner and another entity. Examples of such networks include (but are not limited to) communications networks or platforms such as the Internet, electronic social network platforms, a digital community of a "smart city" configured to provide, for example, ubiquitous connectivity, broadcasting (e.g. TV) networks, financial networks (e.g., banking networks), telephony networks and/or any other network in which words, signs, sounds or images may be exchanged electronically or optically between users or entities and/or sent (e.g., broadcast and/or transmitted) to users or entities. Examples of platforms include Internet search engines, Internet portals, Internet sites, electronic financial (e.g., banking and/or trading) platforms, utility platforms (e.g., customer-relationship management platforms), telecommunication platforms, wireless sensor platforms, machine-to-machine (M2M) networks, vehicular networks, and the like. PIP data on users of communication networks or platforms may be obtained by the network or platform owners or operators in various ways. Correspondingly, embodiments of PIP methods, platforms and systems disclosed herein may be employed in conjunction with networking hardware and/or software.

In some embodiments, the PIP data users may be owners or operators of a commercial facility (store, restaurant, etc.), advertisers, media producers and distributors, etc. In the particular case of a store or restaurant, a PIP data owner may be a customer or client. Elements of his/her PIP data may be obtained by location or positioning technologies. For example, a customer or client located near or inside a store or a restaurant may have his/her location determined and reported by automatic location detection and reporting means (such as Global Positioning System or "GPS" devices), which, as well known, may also be incorporated in mobile devices such as smart-phones. The location information and/or other information such as the type of store or restaurant, the time spent by the client and the type of purchase made there, etc. represent elements of customer or client PIP data that may be transferred to respective PIP data users. According to embodiments of methods disclosed herein the PIP data owner may benefit from the PIP data received by the respective PIP data user.

It is to be understood that the examples above are meant to clarify the terminology and concepts, and are by no means limiting. Methods, platforms and systems disclosed herein quantify and commoditize the PIP data and enable and allow any PIP data owner to profit from his/her PIP data when his/her PIP data (in part or in full) is obtained through any means by a PIP data user.

In some embodiments and as already briefly mentioned above, a PIP data owner may be referred to as a participant. As used herein, a participant is a PIP data owner that provides PIP data. The PIP data provided by a participant may for example be descriptive of an action, related to and/or originated by, a particular PIP data owner. PIP data provided by a participant may for example be descriptive of rating information at different levels and/or responses to questions provided by the participant in response to exposure to a perceptible item. For instance, such PIP data may be descriptive of a rating provided by the participant in response to the exposure to an advertisement and/or a television show. PIP data may also include metadata. Such PIP metadata may for instance be descriptive of the quality and/or quantity of a feedback provided by the participant. For example, PIP metadata may be descriptive of the reliability of a feedback provided by the participant. PIP data descriptive of a feedback of greater reliability may be weighted higher than a feedback of lower reliability or quality. The magnitude of a reward provided to the PIP data owner may for instance be determined based on such metadata.

PIP data may in some embodiments be provided passively, for example responsive to monitoring the behavior of the PIP data owner as evidenced from use of an input device through which the PIP data owner may provide the data. Such monitoring may include exemplarily the tracking of telephone calls, television watching behavior, shopping preferences, internet surfing behavior, and the like.

Clearly, PIP data that is descriptive of a feedback provided in response to the exposure of a perceptible item may add to the PIP data's commercial value. The PIP data may be transmitted through a PIP platform disclosed herein to the PIP data user. The PIP platform may also store, process the PIP data, and "sell" the PIP data also to other PIP data users. The PIP platform may also determine, using various parameters, a "PIP data value" based on the PIP data provided. The PIP platform may then provide to the participant a "reward" that reflects the PIP data value. Additionally or alternatively, a reward may be provided to the participant directly by the PIP data user. The terms "PIP data value" and "reward" will become clearer from the following detailed description. In general, the reward paid to the participant or PIP data owner will be part of a payment paid by the PIP data user to the PIP platform, which pays the PIP data owner.

Otherwise stated, aspects of embodiments of PIP methods disclosed herein may relate to rewarding a PIP data owner who owns associated PIP data in exchange for allowing his/her PIP data to be used by a PIP data user. A PIP method disclosed herein may include, for example, providing the PIP data user with PIP data according to criteria defined by the PIP data owner. The PIP data provided to the PIP data user may comprise data descriptive of the behavior of the PIP data owner monitored over a period of time. The PIP data user may infer or derive from the gathered PIP data a behavioral profile of the PIP data owner. For example, when a participant decides to stop watching a certain commercial, it may be inferred or derived from the PIP data descriptive of that decision that the PIP data owner did not relate to the commercial and/or that he/she was busy at that time. This kind of knowledge about the PIP data owner may be valuable to the PIP data user. The knowledge accumulated on the PIP data owner may increase proportionally with the data gathered. Correspondingly, the accuracy of the PIP owner profile established by the PIP data user may increase with the increase in the knowledge, and so may increase the reward paid to the PIP data owner.

The magnitude of the reward may be determined, e.g. by the PIP platform, based on how valuable the gathered PIP data is for the PIP data user. The magnitude of the reward may be determined based on criteria defined, for example, by the PIP data owner, PIP data user and/or the platform provider.

A PIP method disclosed herein may further include determining, based on the provided PIP data, a profile of the PIP data owner. The magnitude of a reward to be paid to the PIP data owner may then be determined based on the value of the provided PIP data for building the profile.

A reward may comprise one or more "value units" ("V-units"). For example, if the perceptible item is an ad viewed by the participant, and the participant provides feedback responsive to the ad, the participant may be awarded one or more V-units by the PIP platform. The number of V-units of a reward may be calculated using predetermined parameters. In the exemplary case of advertisements, these parameters may include for example a participant openness level (O-level), a participant involvement level (I-level), an exposure space of the ad, and an actual exposure degree of the participant to the ad.

In view of the aforesaid, a method for rewarding a personal intelligence profile (PIP) owner who owns associated PIP data used by a PIP data user, comprises, in some embodiments, the steps of providing a PIP platform that includes a dedicated server that mediates between the PIP data owner and the PIP data user; and through the dedicated PIP platform receiving rules resulting in an automatic filter related to the gathering of PIP data exposing the PIP data owner to a perceptible item; responsive to exposing the PIP data owner to the perceptible item, obtaining PIP data associated with the PIP data owner according to the automatic filter, determining a value of the obtained PIP data, and determining, based on the obtained PIP data, a level of interest of the PIP data owner in the perceptible item.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The invention is herein described, by way of example only, with reference to the accompanying drawings, wherein.

DETAILED DESCRIPTION

The following description of PIP methods, platforms and systems for paying participants or PIP data owners for the usage of their PIP data is given with reference to particular examples, with the understanding that such methods, platforms and systems are not limited to these examples. Otherwise stated, aspects of embodiments of methods disclosed herein may relate to rewarding a PIP data owner who owns associated PIP data in exchange for allowing his/her PIP data to be used by a PIP data user.

A method may include exemplarily providing the PIP data user with PIP data according to criteria defined by the PIP data owner. As outlined and exemplified below in more detail, such criteria may relate to an O-level of the PIP data owner indicative of the extent that PIP data owner is willing to be exposed to information, specifically to a perceptible item associated with a potential PIP data user. The criteria may additionally or alternatively relate to an I-level of the PIP data owner that indicates the extent he/she may be willing to share data indicative of his/her behavior. Accordingly, the PIP data provided to the PIP data user may comprise data descriptive of the behavior of the PIP data owner and monitored over a period of time. PIP data provided to the PIP data user may exemplarily be descriptive of a PIP data owner's feedback, the feedback responsive to the PIP data owner being exposed to a perceptible item associated with the PIP data user.

The method may further include determining, based on the provided PIP data, a profile of the PIP data owner. The magnitude of a reward to be paid to the PIP data owner may be determined based on the value of the provided PIP data for building the profile. The reward paid may thus not only be determined based on the PIP data owner's prior consent to receive or become exposed to the perceptible item associated with the PIP data user, but may also be determined based on data descriptive of the behavior of the PIP data owner responsive to the exposure to such an item.

Figure 1:
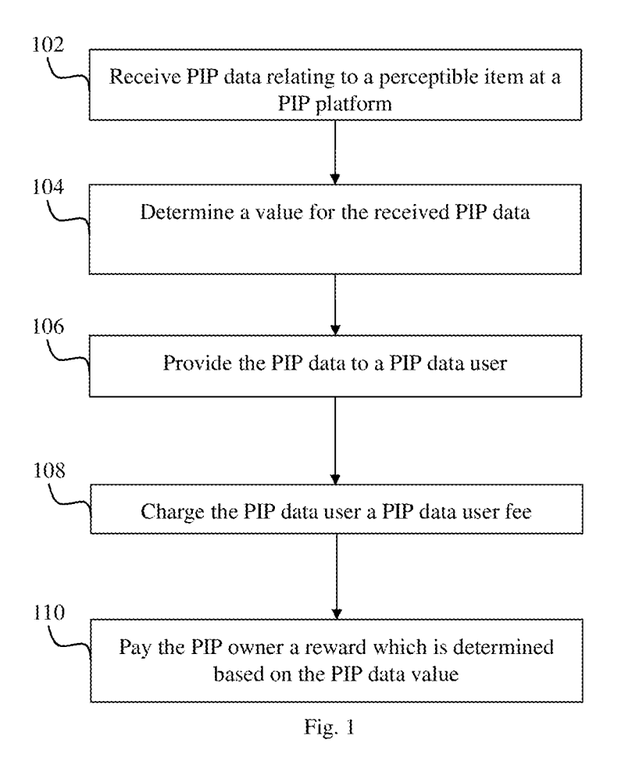
FIG. 1 shows schematically in a flow chart an embodiment of a method disclosed herein.

FIG. 1 shows schematically in a flow chart an embodiment of a method for paying a PIP data owner who owns associated PIP data used by a PIP data user, as disclosed herein. The method is provided using a dedicated PIP platform that includes a dedicated server and which mediates between the PIP data owner and the PIP data user, see more details below. In step 102, the method may include receiving at the PIP platform PIP data associated with a particular PIP data owner. The PIP platform may be configured to control the flow of PIP data from the PIP data owner to the PIP data user according to criteria defined by the PIP data owner. This configuration is to ensure that PIP data may only be provided to the PIP data user in exchange for money and/or monetary equivalent to be paid to the PIP data owner, optionally according to the PIP data owner's preferences. The PIP data may be gathered passively (e.g., by monitoring the PIP data owner's Internet surfing activity and/or by scouring computerized personal profiles and/or email messages), and/or actively (by providing a responsive feedback, with the PIP data owner being a participant). Correspondingly, the PIP data may generally relate to, or be descriptive of, a profile of the participant and/or of a feedback provided responsive to exposing the participant to a perceptible item. The perceptible item may be an advertisement, merchandise, goods, a service, an entertainment activity which may relate exemplarily to the consumption of multimedia content, food, information provided to the PIP owner, a request to the PIP data owner and/or a poll with which the PIP data owner may be confronted, etc.

In some embodiments, the platform may be operative to monitor the actions of the PIP data user to determine whether such actions comply with criteria defined by the PIP data owner. This is to avoid occurrences in which the PIP data user gains access to PIP data from an "unauthorized source", i.e. without authorization from the PIP data owner, and makes use of the PIP data without his/her knowledge and thus without paying the PIP data owner therefor.

In step 104, the method may include, at the PIP platform, determining a PIP data value for the received PIP data. The value of the PIP data may be determined based on one or more parameters, described below in greater detail. Parameters based on which a reward may be determined may depend on a selection made by the PIP data user and/or the PIP data owner. Such parameters may for example refer to a PIP data owner O-level, defined and explained above. Such parameters may further refer to a PIP data owner I-level, defined and explained above. The parameters may be predefined at the PIP platform, for example, by parties which may become or are PIP data users and/or by a provider of the PIP platform. In some embodiments, parameters may be suggested by a PIP data owner. The PIP data user and/or the platform provider may determine whether to accept parameters for selection suggested by the PIP data owner. The PIP data value may optionally also be determined based on predefined criteria.

In step 106, the PIP platform may provide the PIP data to the PIP data user as outlined below in more detail.

In step 108, the PIP platform may charge the PIP data user a PIP data user fee. The data user fee is a fee paid by the PIP data user to the PIP platform for services rendered by the PIP platform, such as facilitating the gathering of PIP data. The PIP platform may decide if and what part of the PIP data user fee may be awarded to the respective PIP data owner.

In step 110, the PIP platform pays the PIP data owner a reward, based on the PIP data value.

In a specific (but not limiting in any way) example of how the PIP method may be applied, the method is applied to advertisements in digital media, for example advertisements exhibited on an electronic display as part of an electronic device. The electronic device includes, or is coupled to, an input device through which a participant (and PIP data owner) may provide PIP data. The advertisements are paid for by an advertiser or advertising agency, which is in this case the PIP data user. A PIP platform serves as a mediator between the PIP data user and the participant. The PIP platform may determine the PIP data value of each participant's PIP data, may charge the advertiser an advertising fee and may pay each participant a reward according to his/her PIP data value. This represents a "payment sharing" venue. Payment by the PIP data user (in this case the advertiser or advertising agency) is made to the provider of the PIP platform. In some embodiments, the payment due to the PIP data owner may remain with the PIP platform for a time period during which it accrues interest. The payment may also be provided by the platform "in kind", i.e. not as cash but as cash equivalents. The specific example of use with reference to ads is described in more detail with reference to FIG. 2.

Figure 2:
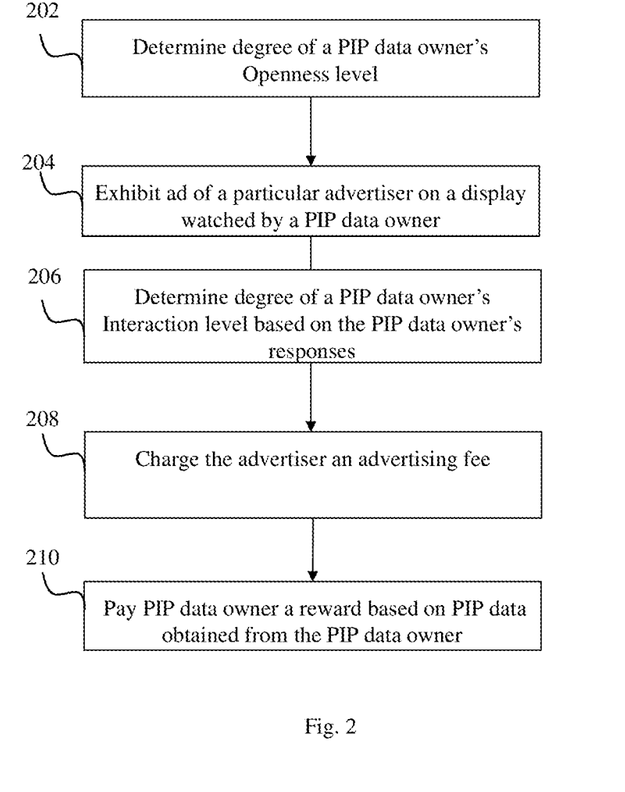
FIG. 2 shows schematically in a flow chart an embodiment of a method implemented in association with an advertisement campaign.

FIG. 2 shows schematically in a flow chart an embodiment of a method disclosed herein, described exemplarily with reference to advertisements in digital media. The various steps are performed by the PIP platform. In step 202, the method may include determining an O-level of a PIP data owner (and participant) to be exposed to an advertisement and/or an I-level or responsiveness of the PIP data owner upon exposure to the advertisement. In step 204, an ad of a particular advertiser (the PIP data user) is exhibited on, exemplarily, a display watched by the PIP data owner. The display may be a TV, computer, tablet or smart-phone display, or any other display that allows interaction and response on the part of the participant. In step 206, a PIP data owner's I-level may be determined based on the responses provided by the participant.

In some cases, no feedback is provided by the participant, while in other cases feedback of various degrees is provided. Various parameters may define a "degree" of feedback. A detailed example of how such parameters determine the degree of feedback is given below.

In step 208, the PIP platform may charge the advertiser an advertising fee. The reward may in some embodiments represent a fraction of the advertising fee. In other words, the fee paid by the advertiser for the ad campaign may be shared between the PIP platform and the participants. The fraction may be determined by the PIP platform. In some embodiments, the advertising fee may include a basic fee to be paid by the advertiser to the PIP platform for the ad campaign. The basic fee may depend on the type of ad campaign being run, but may be independent of the number of participants that were actually reached by the campaign.

In step 210, the PIP platform may determine a reward based on the obtained PIP data, and pay the reward to the PIP data owner. For example, the PIP platform may prepare, process, produce and provide a PIP data report based on which the reward may be determined to the PIP data user.

As already indicated above, PIP data may not only be descriptive of a specific feedback actively provided by the participant responsive to being exposed to a perceptible item, but may also include, for example, general personal profile or background information about the participant. Such information may include exemplarily the participant's IP address, geographic location/s, nature or theme of the website viewed by the participant on which an advertisement is being displayed, the nature of the specific content viewed by the participant, the participant's web viewing history or patterns, as well as other data and psychographic data about the participant (which may be received from a number of different sources) including computerized social profiles. Information may also be collected about the participant's age, location, gender, income, education, ethnicity, religious affiliation, product preferences and a variety of other demographic characteristics that are useful in matching an advertisement to a participant. Information may also be collected about the participant's viewing experience such as the location of participant, the genre of the content viewed, the type of content viewed (e.g., video, slideshow, widget), and the location of the player/participant within the browser.

The "payment sharing" arrangement described above differs substantially from known reward plans, for example airline frequent flier (FF) programs, in a number of aspects: in FF programs, a customer gathers FF points according to mileage traveled or through bonuses awarded by airline partners such as hotels, car rental agencies, etc. The value of each point is determined by the airline. In sharp contrast, in a payment sharing arrangement disclosed herein, the "customer" is a participant or PIP data owner who receives payment for having his/her PIP data provided to the advertiser, essentially "working for" the advertiser or selling his/her PIP data as a commodity by making the PIP data available. In other words, the PIP platform and/or the associated methods may convert a data owner's PIP data into a commodity, by assigning a monetary and/or monetary-equivalent value to the PIP data. The PIP platform may assign a monetary or monetary-equivalent value to the PIP data, e.g., based on the type of the PIP data and/or amount of PIP data and/or based on the criteria based on which the PIP owner allows the PIP platform or system to gather the PIP data from its owner.

According to some embodiments, PIP data may be associated with a corresponding counter-value, optionally expressible in V-values, based on which a monetary or monetary-equivalent reward may be determined.

The V-values may thus be considered or viewed as an independent monetary currency which is backed by an asset or assets in the form of the PIP data, optionally handled by the PIP platform. The V-values are thus tradable, exchangeable into other currencies and/or enable its owners to conduct any transaction. For every issued V-value, certain type and/or amount of PIP data is assigned. Accordingly, the PIP data may serve as a basis for a monetary system (similar to the gold standard of the traditional banking system), in which the standard economic unit of account (V-value) is based on a fixed amount of PIP data and/or type of PIP data.

For example, first PIP data descriptive of first information may be assigned with a counter-value of the same magnitude as second PIP data descriptive of second information and which is different from the first information. In another example, first PIP data may be associated with a counter-value of a magnitude which is different from third PIP data, which is different from the first information. The value assigned to certain PIP data may vary over time depending on supply and demand. In some embodiments, securities may be assigned to third parties for PIP data.

According to some embodiments, the PIP platform be operative to limit the time period during which a selected PIP data user may make use of PIP data. Upon expiry of the said time period, the PIP data may be rendered unusable for the selected PIP data user, e.g., through deletion or (re-)encryption of the respective data. In some embodiments, the PIP platform may lend the PIP data to a PIP user for a predetermined time period against a monetary or monetary-equivalent payment or compensation to be furnished by the PIP data user. The compensation may vary in accordance with the duration of the time-period during which the PIP data is made available to the selected PIP data user.

The reward payment furnished to the PIP data owner may be determined by the PIP platform and may for example be determined on a participant's PIP data provided actively and/or passively by the participant and descriptive of his/her response activity optionally in association with a classification of the perceptible item to which the participant is exposed to, and the like. Correspondingly, the final advertising fee may be determined by the PIP platform based on the number of participants, the type of participation (i.e. quality of ad viewing) and the additional PIP data (if any) provided to the advertiser.

In some embodiments, payment to a participant may be based on criteria representing payment preferences determined by the advertiser. Payment preferences may for example define a maximum threshold of payment to participants, and/or a minimum or maximum number of participants to be exposed to the perceptible item, and/or a certain type of participants (e.g. only women, only teenagers), and/or an amount of exposure of a participant to the perceptible item. The amount of exposure may relate to exposure duration and/or intensity.

For example, the PIP data user may determine that not more than a certain number of participants shall be disbursed with a monetary benefit or reward within a given period of time. Additionally or alternatively, the PIP data user may determine that the campaign should run as long as a minimum number of participants that provide PIP data descriptive of feedback within a given period of time is exceeded. In either case, a basic fee may be paid to the PIP platform by the PIP data user in exchange for using the PIP platform.

Parameters Determining a Reward

Some parameters determining a reward are described next with specific references to ads, with the understanding that such parameters are not limited to ads and may be applied to any other communicated item or activity from the part of a participant. It should also be noted that the parameters and formulas exemplified herein based on which an amount reward may be determined should not be construed as limiting. Additional or alternative parameters and/or formulas may be used.

Participant O-Level

Assume that a participant watches an ad on a display. A first parameter may include the participant's level of openness to be exposed to the ad. The O-level may be determined by the participant and may change from time to time as he/she wishes. The O-level may be defined in different ways or according to different criteria. For example, the O-level may be defined by the number of times the participant chooses (is open to) to watch ads in a time period. The definition may involve a qualitative definition such as "low", "medium" or "high" O-level, or a quantitative definition on a scale of numbers, e.g. from 1 to 10, with 1 referring to the lowest number and 10 referring to the highest number of times in the time period. The O-level may also be defined by the number of pages or web sites the participant is ready to open per viewing session. The O-level may also be defined by the type of ads a participant is open to watch. That is, a participant may define which types of ads he/she wishes to see or not to see. The O-level may be also defined by the type of advertisers whose ads a participant wishes to see or not to see. Receiving only ads that he/she are open to may reduce his/her level of antagonism and can be used as an example of how the O-level may affect a participant's feedback.

Participant I-Level

Additionally or alternatively, a parameter determining a reward may relate to the participant's level of involvement while providing his/her PIP data. The I-level may be determined (e.g., dynamically) based on an I-level selection made by the participant ("participant-selected I-level") and/or based on a measured activity of the participant. The participant's PIP providing activity may be monitored and measured, for example, by the PIP platform. A monitoring activity may exemplarily include monitoring a responsive or feedback action such as a dwell time in an area (e.g., using a GPS) and/or in viewing and/or listening a perceptible item, like for example viewing an ad. In some embodiments, the feedback may be indicative of a dwell time during which the PIP data owner is related and/or acquires and/or chooses to be exposed to information about the perceptible item, and/or a dwell time during which the PIP data owner is related and/or located in a geographical area and/or area of interest. Otherwise stated, a dwell time may be indicative of a time period during which the PIP data owner is related and/or acquires and/or chooses to be exposed to information about the perceptible item and/or indicative of a time period during which the PIP data owner is related with and/or chooses to stay within a geographical area and/or area of interest. Such dwell time or time period may be continuous or may be a sum of intermittent periods of dwell times.

Accordingly, the dwell time may in some embodiments include the time period during which the PIP data owner listens to a particular radio station, radio program, and/or song played by a radio station, viewing time of a particular website, time period of watching a television show, and/or the like. The monitoring engine may for example monitor time period a PIP data owner navigates a particular retail store, area within a retail store and/or examines a particular physical object or item in the retail store. The monitoring may be performed by a monitoring engine of the system which may for example include an eye tracker and/or an in-door and/or outdoor GPS system and/or sensors and/or camera. Additionally or alternatively, the monitoring engine may be operative to measure the time until a participant may provide an input to close a pop-up window displaying the ad such as, for example, monitor activity of a computer mouse (clicks or movements), use of a keyboard, leaving a device ON, switching between site pages, scrolling among text columns, changing the size of a displayed ad, etc. The method may include associating a time stamp with the presentation of the perceptible item to the PIP data owner, associating another time stamp with an input provided by the PIP data owner to the PIP platform not to present the perceptible item any longer, and determining the time period between the two time stamps. The time period between the two time stamps may be referred to as dwell time for instance. In some embodiments, to monitor a movement of the PIP data owner for determining his/her dwell time, e.g., within a given geographical area of interest, a first time stamp indicative of a time of recordation when the PIP data owner first entered the geographical area of interest may be associated with a first location point of the PIP data owner in the geographical area. Furthermore, a second time stamp indicative of another time of recordation may be associated with a second location point of the PIP data owner the first time outside the geographical area subsequent to having entered the said area. The dwell time of the PIP data owner within the geographical area of interest may be obtained by determining the time period between the first and second time stamps. The location points may be received from computerized devices (e.g., navigation devices) associated with the PIP data owner(s). Such navigation devices may for example be mobile devices and/or navigation devices coupled with and/or included in a vehicle driven by the PIP data owner. In some embodiments, responsive actions may additionally or alternatively include counting clicks and/or number of views. In some embodiments, the feedback may be indicative of the number of times a PIP data owner selects not to be exposed to a perceptible item.

The level of interest of the PIP data owner in the perceptible item (which may for example be a retail store, an image, clip, movie, audio and/or any other multimedia presentation and/or a physical object) may be inferred from the PIP owner's dwell time. For example, if the dwell time is above an average dwell-time value, it may be inferred (e.g., by the monitoring engine) that the PIP data owner has more interest in the presented selected perceptible item than most PIP data owners. In some embodiments, a minimum dwell time may be required. Such minimum dwell time may for example be defined by the PIP platform and/or the PIP data user. In some embodiments, the PIP platform may collect dwell times from a plurality of PIP owners to obtain data descriptive of statistics representing the interest of the general population in the perceptible item. The interest of the general population may be inferred from the plurality of PIP data owners, who are part of the general population. The I-level may in some embodiments also relate to the extent to which information about the participant's PIP data activity may be gathered and/or used by another party. The I-level may thus be indicative of the PIP data owner's willingness to make his/her PIP data available. The I-level may relate to criteria defining constraints on the screening and/or use of existing PIP data which may not be related to the exposure to a perceptible item. Such existing PIP data may exemplarily be descriptive of email content and/or of personal profiles, pictures and/or other data published for example on computerized social networks by the PIP data owner, Internet usage behavior by the PIP data owner, location notification and the like. The criteria may define for example whether email messages may be gathered by the PIP platform for a potential PIP data user and to be gathered as PIP data and, if yes, to what extent (e.g., only message older than three months may be screened, only messages of the outbox or only messages which were put into a "trash folder" that are automatically deleted after a certain period of time, and the like).

According to some embodiments, the I-level may relate to criteria defined by the PIP data owner for selectively using the PIP data. The PIP data owner may for instance define that a first part of his/her PIP data may only be gathered for use by a selection of PIP data users of a group of PIP data users, while a second part of PIP data may be gathered for use by all PIP data users that are members of the same group. For instance, with respect to location information, PIP data descriptive of a medical condition may only be gathered by pharmacies located in a mall in which the PIP data owner is located, while PIP data that is not descriptive of the medical condition may be used by all shops located in the mall and, optionally, by shops located in the mall's vicinity.

In an instance in which the PIP data is considered to be important for making a business-wise decision and/or difficult to obtain by other PIP data users, yet many constraints are imposed by a certain PIP data owner on its use, the value of the PIP data may increase. Conversely, if the PIP data is considered to be easily available from other PIP users and/or not that valuable to PIP data user for making a decision, the value of the PIP data may decrease.

Further with respect to location notification, a PIP data owner may for example define criteria as to what extent location information may be gathered and/or used by another entity. In a first exemplary scenario, the PIP data owner may define that another entity may only be provided with PIP data descriptive of a single time stamp of an occurrence when a computerized device associated with the PIP data owner entered a geographical area associated with the other entity. In a second exemplary scenario, the PIP data owner may define that the PIP data user may also gather location information over a period of time to track the movement of the PIP data owner within the geographic information. For example, the PIP data owner may allow the PIP data user to track in-door movement of the computerized device associated with the PIP data owner to analyze shopping behavior. In the first scenario, the PIP data owner may awarded a smaller reward than in the second scenario. In a third exemplary scenario, PIP data descriptive of the PIP data owner's preferences, behavior and the like, may be continuously monitored by the platform and/or the PIP data user, without limitation or substantial limitation imposed by the PIP data owner. In the third scenario, the PIP data owner may disbursed with an even higher reward compared to the reward in the second scenario. In a fourth exemplary scenario, the PIP data owner may define criteria on how associated PIP data descriptive of television content consumption may be gathered and/or used. For example, in a first case, the PIP data owner may allow a PIP data user to gather data descriptive of his/her viewing participation and thus become part of a rating poll. In another, second case, the PIP data owner may in addition actively provide PIP data descriptive of a qualitative feedback about the program or about an advertisement shown during a commercial break. In both cases, the PIP data owner may be awarded or paid with money or monetary equivalent. However, in the second case, the PIP data owner's reward may be higher, since the feedback to a particular advertisement may be of greater value to the PIP data user than mere participation in a viewer rating polling.

The definition of an I-level may involve a qualitative definition such as "low", "medium" or "high" I-level, or a quantitative definition on a scale of numbers, e.g. from 1 to 10, with 1 referring to the lowest I-level and 10 referring to the highest I-level.

In a specific example, the lowest participant-selected I-level may be defined as one in which the participant does not agree to provide any PIP data providing report. A next (second) higher I-level may be defined as one in which the participant agrees to provide anonymous basic PIP data, for example only the time spent watching the ad. A next (third) higher I-level may be defined as one in which the participant agrees to provide, still anonymously, more detailed information, for example by filing in a questionnaire. A next (fourth) I-level may be defined as one in which the participant agrees to provide more detailed information, for example the time spent watching the ad and the basic participant details (like name and IP address). A next (fifth) I-level may be defined as one in which the participant agrees to provide the basic participant details and more detailed information, for example the time spent watching the ad and a filled-in questionnaire. A next (sixth) I-level may be defined as one in which the participant agrees to provide the basic participant details and even more detailed information, for example the time spent watching the ad, the filling in of the questionnaire and the additional PIP data representing, for example, age, gender, telephone number, address, preferences, qualifications, etc. The more additional PIP data provided, the higher the I-level.

If the ad is exhibited on a display of a computerized device (e.g., a PC, tablet or a mobile multi-function device such as a "smart-phone"), there may be a banner running on a section of the display or as a changing screen which shows the I-level chosen by the participant. The I-level may be changed depending on e.g., the ad displayed and/or on the participant's status (busy, tired, etc.) Additional or alternative parameters may be taken into account for defining the participant's I-level.

For determining the O-level and/or the I-level, a challenge-response test may be employed, e.g., by the PIP platform, to determine whether the participant is human or not. Additionally or alternatively, a challenge-response may be employed to prevent a situation in which the participant just opens a device (PC, tablet, smart-phone, TV, etc.) and just skips through ads without actually paying attention to them. Such a challenge-response may for example be a Completely Automated Turing Test to tell Computers and Humans Apart (CAPTCHA).

Clearly, the magnitude of the reward with which the participant may be disbursed may be determined based on the above-mentioned O-level and/or I-level, as exemplified below in the Tables 1-4. It should be noted that in some embodiments, at least two of the parameters defining the reward may be weighted differently, and a weighted average of some sort may have to be determined to obtain the PIP data value. In the examples outlined below, the O-level and the I-level are equally weighted. In some embodiments, the values representing the O-level and the I-level may be normalized.

Table 1 exemplifies maximal ad size and exposure duration and the corresponding O-Level:

TABLE 1

| Displayed ad size | Maximal allowed Exposure Duration as determined by advertiser | O-Level Value (O) |
| --- | --- | --- |
| 2 × 2 cm to 5 × 5 cm | 30 seconds | Low |
| 4 × 4 cm to 8 × 8 cm | 30 seconds | Medium |
| Greater than 8 × 8 cm to 10 × 10 cm | 50 seconds | High |

Clearly, additional or alternative criteria may be used for determining an O-level value such as, for example, advertisement content. Table 2 exemplifies parameters of measured feedback activity and participant selected feedback and the corresponding I-Level:

TABLE 2

| Measured PIP data providing Activity | I-Level Value (I) | Participant Selected I-level | I-Level Value (I) |
|---|---|---|---|
| None | Low | Anonymous Feedback | Low |
| Dwell time on ad from 2 to 5 seconds | Medium | Anonymous + Time Spent Watching | Medium |
| Dwell time on ad of at least 6 seconds | High | Anonymous + Time Spent Watching + Questionnaire | High |

Assume for instance that methods, platforms and systems disclosed herein allow defining three different O-levels and three different I-levels at an ordinal scale, namely "low", "medium" and "high". This means 3×3 possible combinations of O-levels and I-levels can be obtained, as outlined below. For each combination, a certain formula may be used for determining the reward as outlined exemplarily in Table 3 below. Table 3 exemplifies formulas that may be used for determining payment of a reward per ad, depending on the O-level and the I-level:

TABLE 3

| O-Level Value (O) | I-Level Value (I) | Reward per Ad |
|---|---|---|
| Low | Low | x V-units |
| Low | Medium | x V-units × Dwell Time |
| Low | High | (x + y) V-units × Dwell Time |
| Medium | Low | x V-units × Dwell Time |
| Medium | Medium | (x + z) V-units × Dwell Time |
| Medium | High | (x + z) V-units × Dwell Time + y V-units |
| High | Low | (x + y) V-units × Dwell Time |
| High | Medium | (x + z) V-units × Dwell Time + y V-units |
| High | High | (x + y + z) V-units × Dwell Time + y V-units |

Table 4 outlines an example for determining Reward per Ad, depending on the O-level and the I-level for x=1, y=2 and z=3:

TABLE 4

| O-Level Value (O) | I-Level Value (I) | Reward per Ad |
|---|---|---|
| Low | Low | 1 V-unit |
| Low | Medium | 1 V-unit × Dwell Time |
| Low | High | 3 V-units × Dwell Time |
| Medium | Low | 1 V-units × Dwell Time |
| Medium | Medium | 4 V-units × Dwell Time |
| Medium | High | 4 V-units × Dwell Time + 2 V-units |
| High | Low | 3 V-units × Dwell Time |
| High | Medium | 4 V-units × Dwell Time + 2 V-units |
| High | High | 5 V-units × Dwell Time + 2 V-units |

Clearly, the above-outlined example for determining the magnitude of a reward should by no means to be construed as limiting. For instance, the degree of O-level and/or I-level may in some embodiments be defined differently, e.g., by a greater number of qualitative attributes, or quantitatively on a numerical scale ranging, for example, between 1 and 10, as outlined herein above. The scaling may change depending on the resolution or number of parameters taken into account for determining the I-level and/or O-level. For instance, the quality of the input provided by the participant on a questionnaire may in some embodiments be assessed and taken into account for determining the I-level.

Table 5 provides another example for determining an O-level

TABLE 5

| Ads per minute | |
|---|---|
| Criteria | Value (A) |
| Up to 1 ad per minute | 0.5 |
| More than 1 ad per minute and up to 5 ads per minute | 1 |
| More than 5 ads per minute | 2 |

| Readiness to be exposed to X % of ad types | |
|---|---|
| Criteria | Value (B) |
| Up to 10% of ads | 1 |
| Up to 30% of ads | 2 |
| Up to 50% of ads | 3 |
| Up to 70% of ads | 4 |
| All types of ads | 5 |

| O-Level Value (O) Range (A × B) |
|---|
| 0.5 to 10 |

Tables 6-7 below exemplify the determining of an I-level. Table 6 shows exemplary personal Information provided by the Participant and Corresponding Value (P) of the Provided Information (P=the sum of all the P Values provided).

TABLE 6

| Personal Information | Value (P) |
|---|---|
| Age | 0.1 |
| Gender | 0.1 |
| Ethnicity | 0.2 |
| Telephone number | 0.3 |
| Address | 0.3 |
| Personal Preferences | 0.4 |
| Personal Qualifications | 1.5 |

Table 7 provides an example for determining an I-level, in which the parameter Q represents the number of questions provided to the Participant in a questionnaire. As an example only, Q takes the value 2 when the questionnaire comprises two questions.

TABLE 7

| Participant Selected Feedback | | I-Level |
|---|---|---|
| Criteria | Value C | value |
| No Information provided | 0 | 0 |
| Allows providing information only anonymously | 1 | 1 |
| Allows providing information only anonymously + filling in a questionnaire | 2 | 2 |
| Providing of information non-anonymously | 3 | 3 |
| Providing of information non-anonymously and allows filling in a questionnaire | 3 + 1/Q | 3.5 |
| Providing of information non-anonymously and monitoring and allows filling in a questionnaire and allows gathering and use of personal information | 3 + 1/Q + P | 3.5 + P |

As exemplified herein in Table 8 below, the determination of the PIP data value may be based on the product of the O-level value with the I-level value. In other words, the PIP data value may be defined as a function of O×I=M where M is the product of the O-value and the I-value.

Bonus Determination

According to some embodiments, the O-level and/or the I-level may be used to determine a bonus (B) which is may be paid to a participant in return for being attentive to an ad during the ads entire display duration. Such bonus may for example be defined by the mathematical term:
2×O-level value×I-level value or, in abbreviated form: 2×O×I or 2×M where M=O×I.

Table 8 shows an exemplary determination procedure of the PIP data value

TABLE 8

| Recommended Display Time of an Ad (seconds) t2 > t1 | Actual duration of paying attention to the Ad by Participant (seconds) | PIP data Value | Remarks |
| --- | --- | --- | --- |
| T | ≥T | M × T + 2M | PIP data value does include Bonus (2M) |
| T + t1 | ≥T + t1 | M × (T + t1) + 2M | PIP data value does include Bonus (2M) |
| T + t2 seconds | ≥T + t2 | M × (T + t2) + 2M | PIP data value does include Bonus (2M) |
| T | <T | M × G | PIP data value does not include a Bonus |
| T + t1 | <T + t1 | M × G | PIP data value does not include a Bonus |
| T + t2 seconds | <T + t2 | M × G | PIP data value does not include a Bonus |
| Not Applicable | G < 5 seconds | 0 | |

It is noted that the I-level value may be set to Zero if, for example, no input is received from an input device during the display of the ad (e.g., no mouse movement within two minutes of display of the ad); if the screen is turned off; if the ad displayed by the advertiser is masked by another application window; if the participant attempts to override or prevent the display of the ad, if it is determined that the participant is not human but a robot and/or if sound is turned off.

Since in some embodiments the PIP data value may be a sum of two or more products, each comprising the I-level and the O-level as factors, the PIP data value may be set to Zero if one or more of the above-mentioned criteria for setting the I-level to Zero is met.

Table 9 below exemplifies instances at which the I-level is set to Zero:

TABLE 9

| Criteria | I-level |
| --- | --- |
| Screen turned off for more than 30 seconds | 0 |
| No input detected for more than 2 minutes | 0 |
| Size of displayed ad is screened/covered or minimized | 0 |

According to some embodiments, the PIP system may be operative to filter out a PIP data owner(s) according to the I-level and/or O-level by them. The PIP system may for instance group the PIP data owners according to the at least one criterion based on which PIP data may be provided to PIP data users and/or according to the at least one criterion according to which a PIP data owner or owners may be exposed to one or more perceptible items.

PIP System and Platform

Figure 3:
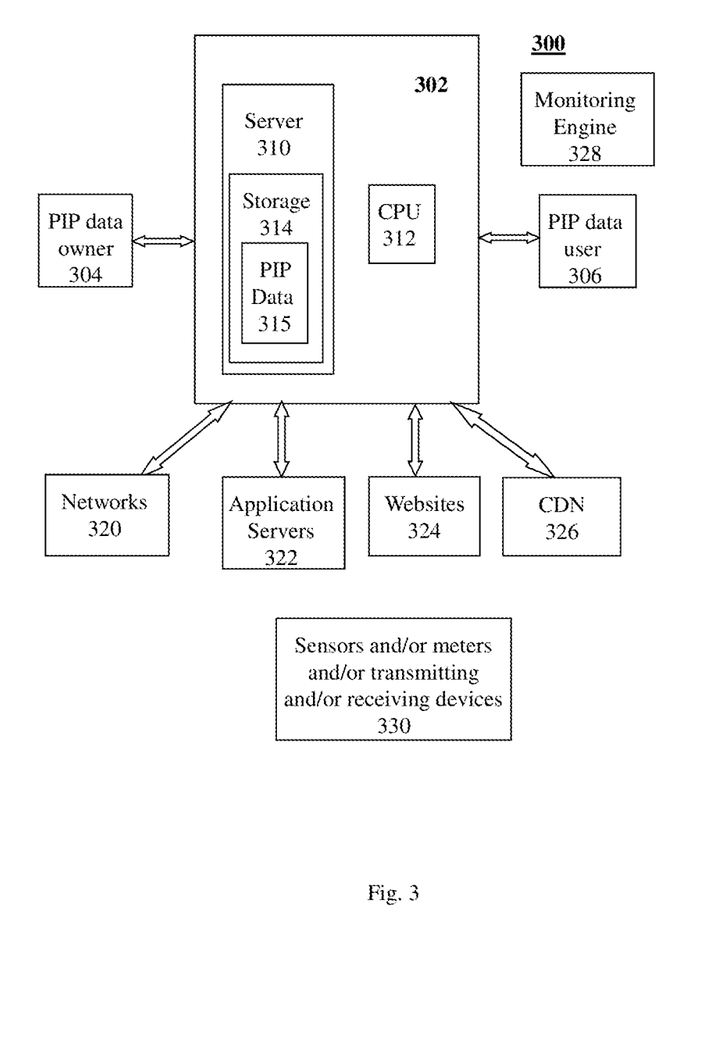
FIG. 3 illustrates in a block diagram an embodiment of a PIP system that enables implementation of various method embodiments disclosed.

FIG. 3 illustrates in a block diagram an embodiment numbered 300 of a PIP data system that enables implementation of various method embodiments disclosed. PIP data system 300 includes a PIP platform 302 configured to mediate communication between one or more PIP data owners 304 and one or more PIP data users 306. Platform 302 may for example be configured to obtain and process each PIP data owner's PIP data, to communicate selected or all parts of such PIP data to interested PIP data users, to receive and process PIP data user requirements and payments and to pay (in money or equivalents) a PIP data owner for his/her PIP data. In order to perform these tasks, platform 302 includes a dedicated server 310 with at least one processor such as a central processing unit (CPU) 312 and a storage (memory) 314 operative to store PIP data 315. Server 310 may be communicably coupled to a database (not shown), and input/output interfaces (not shown) and communications device (not shown). PIP platform 302 may be configured to communicably interact with a variety of networks 320, application servers 322, websites 324, content delivery networks (CDN) 326 of any kind and/or monitoring engines 328. A processor may additionally or alternatively relate to a controller. Monitoring engine 328 may be operative to receive data from sensors and/or meters and/or any other data monitoring and/or transmission/receiving 330 that are associated with the PIP data owner. Such sensors and/or meters and/or monitoring and/or data transmitting and/or receiving devices 330 may relate or include e.g. GPS, a SIM, a modem, sensor such as e.g. a temperature sensor, a pressure sensor, a humidity sensor, an air pollution measurement sensor, a gas sensor, a noise sensor, an optical camera, a thermographic camera, an infrared sensor, a motion detector, an eye tracker, a gait sensor, a mobile phone tracking system (e.g., through triangulation), a traffic control system, an accelerometer, a sound meter, a sensor and/or meter providing data which is descriptive of a physical condition and/or change in the physical condition of the PIP data owner, such as a vital signs monitoring sensor (e.g., blood pressure, breathing rate, pulse rate, glucose, a plethysmograph, a depth of anesthesia, and/or vaso-dilatation/constriction, an arterial tone value and/or a blood oxygen saturation sensor and/or meter); and/or any current and/or future sensor and/or meter that may provide PIP platform 302 with data that is associated with the PIP data owner. Such sensors and/or meters may in some embodiments include or relate to wearable devices.

CPU 312 executes software code for the basic operation of the platform 302. The executable code may include an Operating System (OS), programs, device drivers and other software components. CPU 312 is configured to determine a reward based on the PIP data values.

PIP system 300 may include device drivers may for example include I/O device drivers (not shown) and network interface drivers (not shown). A device driver may for example interface to a keypad or to a USB port. A network interface driver may execute protocols for the Internet and/or an intranet and/or Wide Area Network (WAN), Local Area Network (LAN) and/or Personal Area Network (PAN) and/or extranet, and/or other communication networks.

Memory 314 may include transactional memory and/or long-term storage memory facilities and may function as file storage, document storage, program storage, or as a working memory. The latter may be in the form of a static random access memory (SRAM), dynamic random access memory (DRAM), read-only memory (ROM), cache or flash memory. As working memory, memory 314 may, for example, process temporally-based instructions. As long-term memory, memory 314 may include a hard drive, a portable drive, a portable disk (e.g., a CD-ROM, DVD, etc.), a tape facility, or other storage facility. A hardware memory facility may store a fixed information set (e.g., software code) including, but not limited to, a file, program, application, source code, object code, and the like.

Example of Use

According to a known practice, an advertiser may commit to run a 1 million US dollar advertising campaign in the form of half a page "jumping" banner is be run for a cumulative total of 168 hours (one week) on an Internet site. It is estimated that the site is entered each day by an average of 100 potential viewers, for a total of 700 entrances for the week. In most cases the advertiser has no influence on the number of site users, and no assurance that those entering the site will view the ad and accord it the advertiser's desired attention. More importantly the advertiser has no feedback or reaction to his campaign It is entirely possible that site users will ignore the ad, for which campaign the advertiser committed to pay the abovementioned sum. The 1 million USD fee for running the campaign may be paid, e.g., to a network platform running the ad, entirely in advance or for instance, incrementally as the campaign proceeds.

According to a method disclosed herein, instead of paying a fixed fee of, e.g., 1 million USD, to the network platform, the advertiser may pay the PIP platform for example a base fee of $100,000, which itself can be determined according to various criteria. The remainder ($900,000) may be paid through the PIP platform to the participants for the feedback derived from their actual ad viewing over a predetermined time period, exemplarily 1 month. This sum, minus a processing fee to the platform service provider (e.g. 1% of the $900,000) of PIP platform 300, will be distributed among participants viewing the ad and providing PIP data, e.g., descriptive of feedback, to the advertiser. That is, in this example, the advertiser pays (as before) a total of 1 million US dollars, of which $891,000 are paid as a "reward" to participants and $109,000 are paid to the PIP platform. The ad campaign may end when at least 700 participants have viewed the ad and provided PIP data over a cumulative 168 hours and for a given ad. In addition or alternatively, the ad campaign may end if the campaign has run for a predetermined time period (e.g., 50, 100 or 110 hours). Further in addition or alternatively, the ad campaign may end if the reward with which the participants are being disbursed for is below a predetermined threshold within a certain period of time (e.g., below 200,000 USD after 7 days into running of the campaign). In some embodiments, the viewing experience may be different for at least two participants of a multiplicity of target participants of the campaign in terms of ad size and/or duration of ad exposure duration. The PIP data received from each participant may also be different. The advertiser may define the number of times and frequency that an ad is displayed on a particular IP address or the number of times a particular viewer may view the ad. The advertiser may also prevent the ad from being displayed on the same IP address more than a predetermined number of times. That is, for example, in order to ensure that the number of persons that become exposed to the ad is maximized within the given constraints.

Assume that 500,000 participants viewed the ad and provided PIP data responsive thereto. The $891,000 reward will exemplarily be determined in V-units, where each V-unit is worth $1, as follows:
1. 101,000 participants who provided PIP data valued at $1 receive each 1 V-unit, for a total of $101,000.
2. 245,000 participants who provided PIP data valued at $2 receive each 2 V-units, for a total of $490,000.
3. 100,000 participants who provided PIP data valued at $3 receive each 3 V-units, for a total of $300,000.

Each participant may use his/her V-unit (essentially money or monetary equivalent) at any company or entity using this platform (system) using a payment platform such as electronic (E) wallet, smart-phone or V-unit dedicated credit card, an online payment service, etc. PIP platform 300 may disburse a vendor with money in a tradable currency, upon completion of a sale of goods and/or services in exchange for V-unit money. The vendor may be disbursed with money in exchange for V-unit money, with or without imposing a commission on the vendor.

In addition or alternatively, a participant may convert his/her V-units into cash under predetermined conditions, for example after a predetermined time period. During that time, the V-units held by the PIP platforms may accrue interest.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein. For example, any digital computer system (exemplified herein as PIP system 300) can be configured or otherwise programmed to implement a method disclosed herein, and to the extent that a particular digital computer system is configured to implement such a method, it is within the scope and spirit of the disclosure. Once a digital computer system is programmed to perform particular functions pursuant to computer-executable instructions from program software that implements a method disclosed herein, it in effect becomes a special purpose computer particular to an embodiment of the method disclosed herein. The techniques necessary to achieve this are well known to those skilled in the art and thus are not further described herein.

Computer executable instructions implementing an embodiment of a method disclosed herein can be distributed to users on a non-transitory computer-readable medium and are often copied onto a hard disk or other storage medium. When such a program of instructions is to be executed, it is usually loaded into the random access memory of the computer, thereby configuring the computer to act in accordance with a method disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing embodiments of a method disclosed herein.

Where applicable, although state diagrams, flow diagrams or both may be used to describe embodiments, the embodiments disclosed herein are not limited to those diagrams or to the corresponding descriptions. For example, flow need not move through each illustrated box or state, or in exactly the same order as illustrated and described.

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

All references mentioned in this specification are herein incorporated in their entirety by reference into the specification, to the same extent as if each individual patent was specifically and individually indicated to be incorporated herein by reference. In addition, citation or identification of any reference in this application shall not be construed as an admission that such reference is available as prior art to the present application.

The invention claimed is:

1. A method for rewarding a personal intelligence profile (PIP) owner who owns associated PIP data used by a PIP data user, comprising the steps of:
providing a PIP platform that includes a dedicated server that mediates between the PIP data owner and the PIP data user;
receiving by a vehicle telemetry interface, vehicle-related telemetry information from a car telemetry system;
assessing by a telemetric analysis engine, a stress level of the drive from the information received from the car telemetry system;
receiving by an information fusing apparatus, an image of the driver captured by a hyper spectral camera capable of imaging body features invisible to a human;
analyzing the image by an image analysis engine, to receive at least one indicator to a clinical parameter of the driver;
and through the dedicated PIP platform:
receiving rules resulting in an automatic filter related to the gathering of PIP data, wherein the rules are based on the clinical parameter of the driver and on the stress level of the driver;
exposing the PIP data owner to a perceptible item;
responsive to exposing the PIP data owner to the perceptible item, obtaining PIP data descriptive of driving behavior of the PIP data owner or vehicle performance of a vehicle driven by the PIP data owner according to the automatic filter, wherein the PIP data descriptive of the driving behavior or the vehicle performance is processed at the vehicle;
determining a value of the obtained PIP data; and
determining, based on the obtained PIP data, a level of interest of the PIP data owner in the perceptible item and an extent the PIP data owner is willing to be exposed to a perceptible item.

2. The method of claim 1, further comprising paying the PIP data owner a reward based on the obtained PIP data value.

3. The method of claim 1, wherein the PIP data is descriptive of a feedback provided responsive to the PIP data owner's exposure to the perceptible item.

4. The method of claim 3, wherein the feedback is a dwell time of the PIP data owner during which the PIP data owner acquires information on the perceptible item, and wherein the dwell time of the PIP data owner is a time during which the PIP data owner is located in a geographical area and/or a geographical area of interest.

5. The method of claim 4, wherein the dwell time is acquired by one or any combination of the following: an eye tracker, a GPS, a sensor, a camera, a recording device, a monitoring device, data transmission, a receiving device, and a time period measured from a time stamp when information relating to the perceptible item is acquired by and/or related to the PIP data owner to a time stamp associated with an input provided by the PIP data owner to the PIP platform indicating that information relating to the perceptible item is no longer acquired by the PIP data owner.

6. The method of claim 1, wherein the providing a PIP platform that includes a dedicated server includes providing a server that includes a processor and a memory, wherein the processor is configured to execute instructions stored in the memory to assign the PIP data value and to determine the reward based on the PIP data value of the obtained PIP data.

7. The method of claim 1, wherein the parameters include an openness level parameter and/or an interaction level parameter defined by the PIP data owner.

8. The method of claim 7, wherein a selection is made for the openness level parameter and/or the interaction level parameter by the PIP data user and/or PIP data owner using the platform.

* * * * *